US008044626B2

(12) United States Patent
Adamus et al.

(10) Patent No.: US 8,044,626 B2
(45) Date of Patent: Oct. 25, 2011

(54) SELF-POWERED ASSEMBLY FOR THE ACTUATION OF A ROLLER BLIND OR AWNING

(75) Inventors: Mélanie Adamus, Gray (FR); Valérie Bourgeois, Epagny (FR); Emmanuel Carvalheiro, Gray (FR); Floriant Lallemand, Gray (FR); Régis Leuvrey, Oyrieres (FR); Guillaume Pailleret, Mantoche (FR); Patrick Pignot, Saint-Sigismond (FR); Claude Vitali, Gy (FR)

(73) Assignee: SIMU, Arc-les-Gray (FR)

( * ) Notice: Subject to any disclaimer, the term of this patent is extended or adjusted under 35 U.S.C. 154(b) by 314 days.

(21) Appl. No.: 11/959,624

(22) Filed: Dec. 19, 2007

(65) Prior Publication Data

US 2008/0150461 A1 Jun. 26, 2008

(30) Foreign Application Priority Data

Dec. 26, 2006 (FR) ..................................... 06 11369

(51) Int. Cl.
*H02P 7/00* (2006.01)

(52) U.S. Cl. ........ 318/446; 318/445; 318/466; 318/286; 318/266; 318/264

(58) Field of Classification Search .................. 318/446, 318/445, 466, 286, 266, 264
See application file for complete search history.

(56) References Cited

U.S. PATENT DOCUMENTS 5,760,558 A * 6/1998 Popat ............................ 318/480
6,369,530 B2 * 4/2002 Kovach et al. .................. 318/16
6,812,662 B1 * 11/2004 Walker .......................... 318/280
6,983,783 B2 * 1/2006 Carmen et al. ................ 160/120
7,281,561 B2 * 10/2007 Anderson et al. .......... 160/121.1
7,389,806 B2 * 6/2008 Kates ................................ 160/5
2002/0196376 A1 12/2002 Symoen et al.
2006/0000558 A1 1/2006 Fennell

FOREIGN PATENT DOCUMENTS

DE 202 10 770 U 1/2003
EP 1 274 199 A 1/2003
JP 7-102866 4/1995

* cited by examiner

*Primary Examiner* — Bentsu Ro
*Assistant Examiner* — David Luo
(74) *Attorney, Agent, or Firm* — Frommer Lawrence & Haug LLP; Ronald R Santucci

(57) ABSTRACT

An actuation assembly (INST) of a screen (SCR) for closure, solar protection or privacy, comprising, on the one hand, a motorized actuator (ACT) furnished with wireless control command receiving means (RCU) and, on the other hand, a standalone power supply assembly (PWU) furnished with at least one rechargeable accumulator (BAT) and with a power supply connector (PR), designed to be connected to the motorized actuator (ACT) via an electric connection line (LIN) for the latter to be supplied with power by the energy of the accumulator (BAT), wherein the power supply assembly (PWU) comprises a man-machine interface (MMI) whose activation allows the transmission of information to the actuator, this information relating to the control of the wireless control command receiving means (RCU) of the actuator (ACT).

11 Claims, 6 Drawing Sheets

Fig. 2 : Prior Art

SELF-POWERED ASSEMBLY FOR THE ACTUATION OF A ROLLER BLIND OR AWNING

This application claims priority benefits from French Patent Application No. FR 06 11369 filed Dec. 26, 2006, the disclosure of which is hereby incorporated by reference.

BACKGROUND OF THE INVENTION

The invention applies to a power supply assembly for a motorized actuator of doors, windows, blinds. Such an actuator may be supplied directly by the mains or by a autonomous power supply assembly comprising a battery kit.

The battery kit usually consists of a source of current, for example a group of batteries or accumulators and at least one connector to connect it to a motor. The source of current is preferably placed in a casing, the connector being placed inside or outside this casing or being mounted on a face of the casing.

If the autonomous power supply assembly comprises a group of rechargeable accumulators, it also comprises an external source of current and an appropriate connection. This external source may comprise an assembly of photovoltaic cells or a solar panel, more usually an energy generator or if necessary a battery.

The autonomous power supply assembly may be mounted close to the actuator or be located at a distance at least partly in a more appropriate place, for example outside a roller blind case, in a place that is more discreet or if necessary more accessible, and advantageously close to the battery kit. A power supply cable or a direct connection between the various elements of the power supply assembly and of the actuator are provided according to the desired spatial configurations.

DESCRIPTION OF THE PRIOR ART

As shown in FIG. 2, the utility model DE 202 10 770U or the patent application JP 07-102866 describe a roller blind SCR moved by an actuator ACT supplied in a autonomous manner by a power supply assembly comprising a solar panel PVC placed on the case of the roller blind and accumulators BAT that can be recharged by solar energy via a charging circuit REG. An auxiliary socket is also provided for the connection of the roller blind by means of an external power supply source EXT. This external power supply source may be an external battery or power mains. It may be used for directly supplying the actuator or charging the accumulators if the energy level of the latter is too low.

This auxiliary socket is preferably accessible to the user, and in particular, may be placed between the extended apron of the roller blind and the window or at the bottom of one of the lateral guides in which the roller blind apron slides.

A self-powered system may be controlled by wire or wireless means. Particularly in the latter case, it is a known practice to seek to limit energy consumption as much as possible, and in particular the consumption of a receiver of movement commands sent to the actuator by electromagnetic waves of the infrared or radio type, so as to limit any unnecessary discharge of the autonomous power supply source. This consumption may be reduced by the use of electronic components and appropriate circuits.

The documents cited above do not address this problem since a possibility is provided to recharge the battery if the energy level is too low.

SUMMARY OF THE INVENTION

However, the object of the invention is to improve the known devices of the prior art, while proposing a simple and ergonomic modular solution.

The invention furthermore proposes to make functionalities available for the various clients, whether they be integrators, installers, logistics operators or end-users.

Therefore, the integrator must adjust at the factory a self-powered actuator in the middle of other actuators that are self-powered or supplied by the mains. In this case, the idea consists in allowing the integrator to make his adjustments by limiting the use of radio, and protecting the system against the other adjustments being made by disabling the radio listening function.

The product may be delivered with the battery installed. In this case, the object of the invention is to ensure, while the self-powered actuation assembly is being transported, that there is no inappropriate movement, and to reduce battery discharges as much as possible other than what is natural.

Once installed, it must also be easy to make the system functional or to limit its consumption. For mains-supplied actuators, these functionalities are accessible for example on power-up or following a particular powering-down sequence. In the case of self-powered actuators, these functionalities must be possible without disassembling the assembled blind or without opening the case. Therefore, the Velux company proposes a man-machine interface on its self-powered actuators. This solution matches the requirements of various clients in terms of pairing, resetting, switching off the gear motor, but is not satisfactory from the point of view of accessibility once the product is installed.

The actuation assembly according to the invention is defined by claim 1.

Various embodiments are defined by dependent claims 2 to 10.

The installation according to the invention is defined by claim 11.

BRIEF DESCRIPTION OF THE DRAWING

The appended drawing represents, as examples, various embodiments of the actuation assembly according to the invention.

DESCRIPTION OF THE PREFERRED EMBODIMENTS

Figure 1:
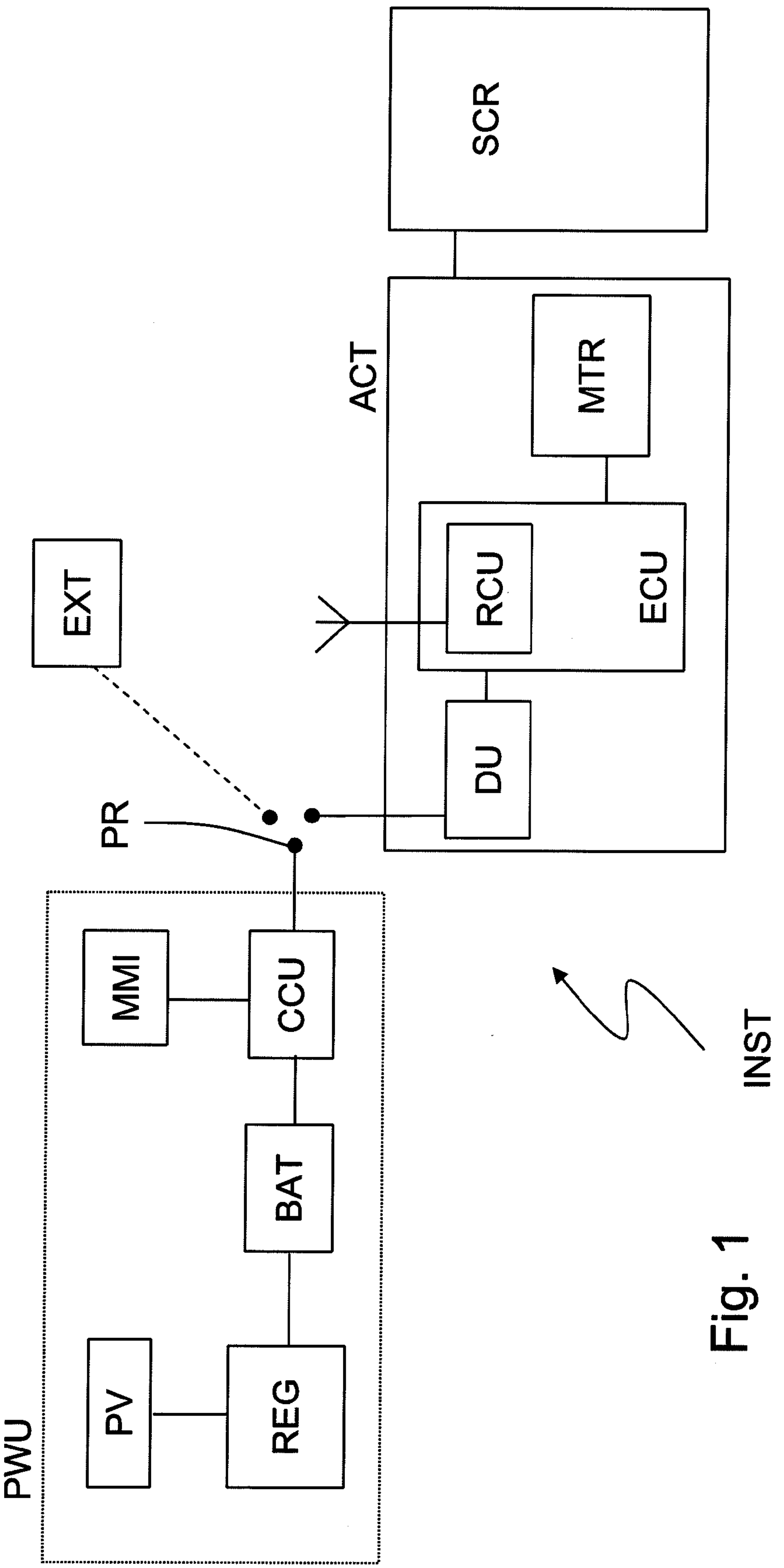
FIG. 1 is a wiring diagram of an actuation assembly according to the invention.
Figure 2:
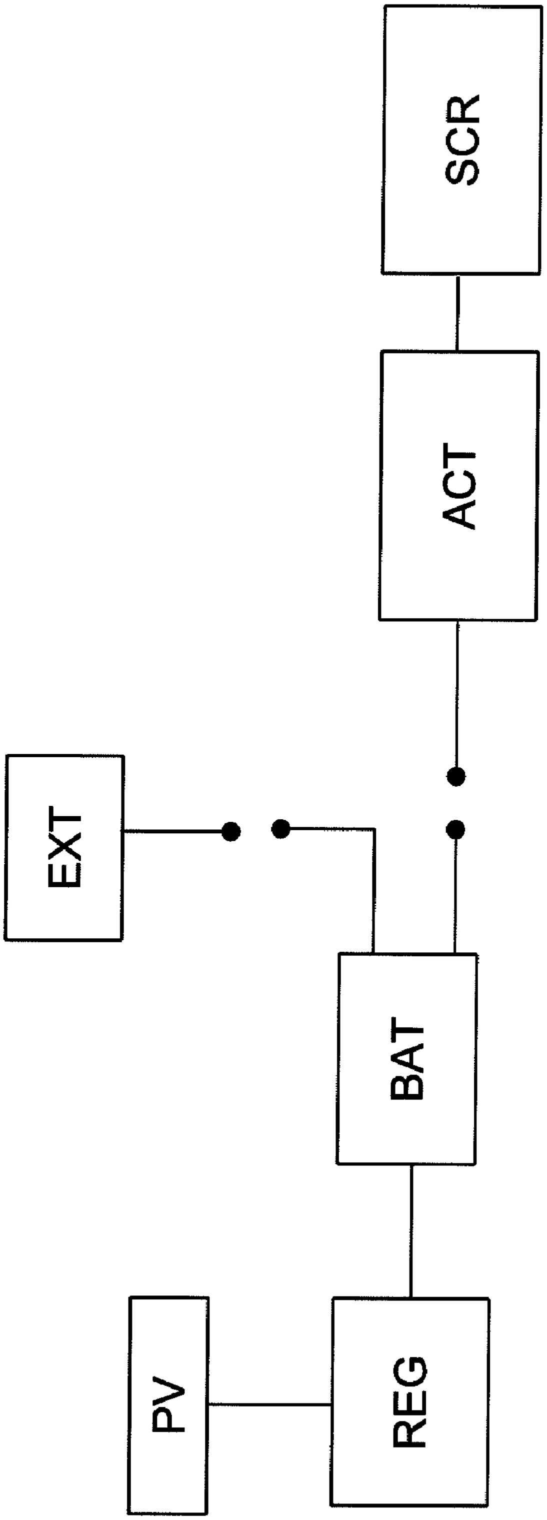
FIG. 2 is a wiring diagram of an actuation assembly known in the prior art.

The installation INST comprises an actuator ACT comprising a gear motor MTR and a gear motor electronic control unit ECU and a radio control command receiver RCU and a means DU for detecting voltage variations on a power supply line.

The actuator ACT is supplied via the power supply line by a autonomous power supply assembly PWU comprising at least one rechargeable battery BAT, coupled to a charging circuit REG, itself connected to a photovoltaic panel PVC supplying energy that can be stored in the battery BAT.

For reasons associated with energy autonomy, the consumption of the actuator must be reduced. At the time of a controlled movement, the actuator ACT consumes the energy provided by the battery BAT. In parallel, the control command receiver RCU must remain in a standby mode in order to be able to react to control commands from a radio control command transmitter. The consumption of the receiver is therefore substantially continuous, whether it be in standby mode or in processing mode when a message is received. The battery BAT must therefore be capable of supplying such energy.

In a known manner, the control command receiver RCU is a low-consumption receiver.

In various cases explained above, it is useful to be able to completely disable the listening function of the control command receiver RCU, independently of the power supply of the actuator. For this purpose and according to the invention the power supply assembly PWU also comprises a man-machine interface MMI coupled to a command determination unit CCU, according to the activation of the man-machine interface MMI.

The man-machine interface MMI accordingly comprises at least one functional button Fl, whose activation makes it possible to disable or reestablish the listening capabilities of the actuator, that is to say to activate or not activate the command receiver RCU.

Other functionalities may be transmitted from the autonomous power supply assembly PWU, for example:

- Awakening the receiver to begin the pairing of a radio control point to the actuator.
- Resetting the memory of the receiver RCU.
- Resetting the operating parameters of the gear motor MTR (pairings and adjustments of the ends of travel for example), stored in the electronic control unit ECU.
- Disabling the command receiver RCU.

The same functional button Fl may be used to transmit the functionalities described above to the actuator, using particular ergonomics determined by pressing times, successions of pressings or sequences of pressings.

The command determination unit CCU then translates these commands, formed by these pressing times, these pressing successions or these pressing sequences, in the form of particular signals, in order to transmit them to the electronic control unit ECU of the actuator, particularly by using the power supply line between the power supply assembly PWU and the actuator or for example by using a bus-type line making it possible to transport the power supply and the information simultaneously, or with a line intended to the transfer of information only. These signals may for example consist in variations of the power supply voltage. They are then detected and identified within the means DU for detecting variations in the power supply voltage.

Various known power supply and communication protocols may be used, such as for example the protocol defined in application EP 1 274 199.

The actuator is connected to the power supply assembly PWU by a power supply line LIN. A connector PR allows rapid connection between the actuator and the power supply assembly. The link between the charging circuit REG and the actuator is interrupted if the actuator is disconnected from this power supply connector PR. The latter may then be used to connect an external source of current EXT, whether it be a battery or the mains. The battery BAT is then charged by means of this external source EXT, through the charging circuit REG, so as to alleviate a temporary lack of energy supply by the photovoltaic panel PVC.

Figure 3:
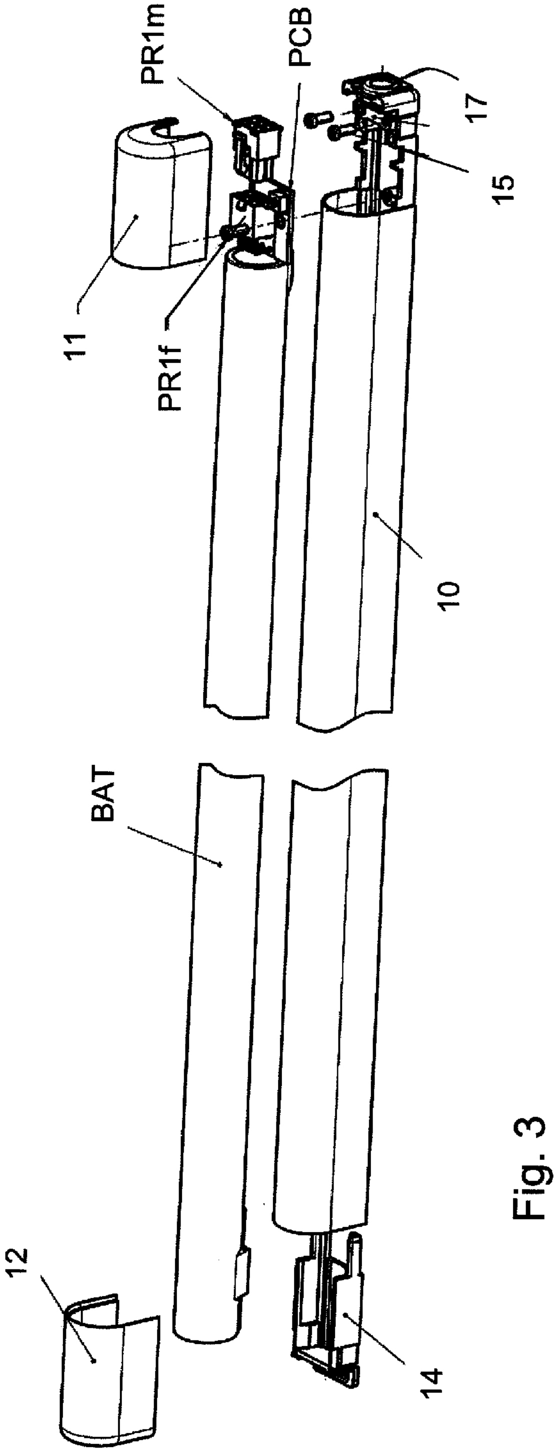
FIGS. 3 and 4 are exploded views of a first embodiment of an actuation assembly according to the invention.
Figure 4:
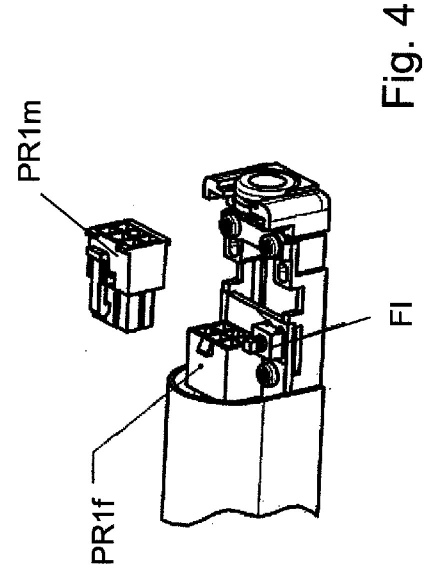

FIGS. 3 and 4 represent an embodiment of the autonomous power supply assembly PWU with an internal or external connector.

The battery BAT is preferably housed in a casing 10 of elongated shape, furnished at its ends with two removable covers 11 and 12.

The battery BAT may be in the form of a plurality of rechargeable accumulators mounted in series, one after the other in the casing. The battery poles are connected to a printed circuit board PCB, also comprising the charging circuit REG (not shown). Furthermore, the photovoltaic cell panel PVC (not shown) is connected to the charging circuit, so as to supply the battery by converting light energy into electric current that can be accumulated in the battery.

The command determination unit CCU (not shown) is also connected to the printed circuit board PCB.

FIG. 3 shows an exploded view of a portion of the autonomous power supply assembly PWU. The casing 10 is fitted at its ends with shoes 14 and 15, where necessary removable, making it possible to more easily insert the battery assembly BAT into the elongated casing. The shoe 15 is furnished with a cable entry provided for the insertion of the cable LIN connected to the gear motor MTR in the casing 10. The cable LIN is connected at its end inserted into the cable entry to a connector PR1*m* that can be moved relative to the casing 10 or to the shoe 15. This connector PR1*m* may be connected to another connector PR1*f* attached to the printed circuit board PCB and connected electrically to the battery BAT. Therefore, when the movable connector PR1*m* is plugged into the fixed connector, the gear motor MTR is electrically connected to the battery BAT.

The shoe 15 and respectively the shoe 14 are covered by removable covers 11 and 12. When the cover 11 is removed, the connectors PR1*f* and PR1*m* may be disconnected. The fixed connector PR1*f* may then be used for recharging the battery BAT via the external source EXT. Alternatively, or simultaneously, the connector PR1*m* may be used for direct supply via the external source EXT. This external source may be different depending on whether it is intended to recharge the battery or to supply the actuator.

FIG. 4 shows the detail of the connectors PR1*f* and PR1*m* once installed on the shoe 15. Also mounted on the functional button Fl is the printed circuit board PCB. The latter is also accessible when the cover 11 is removed from the casing 10.

Figure 5:
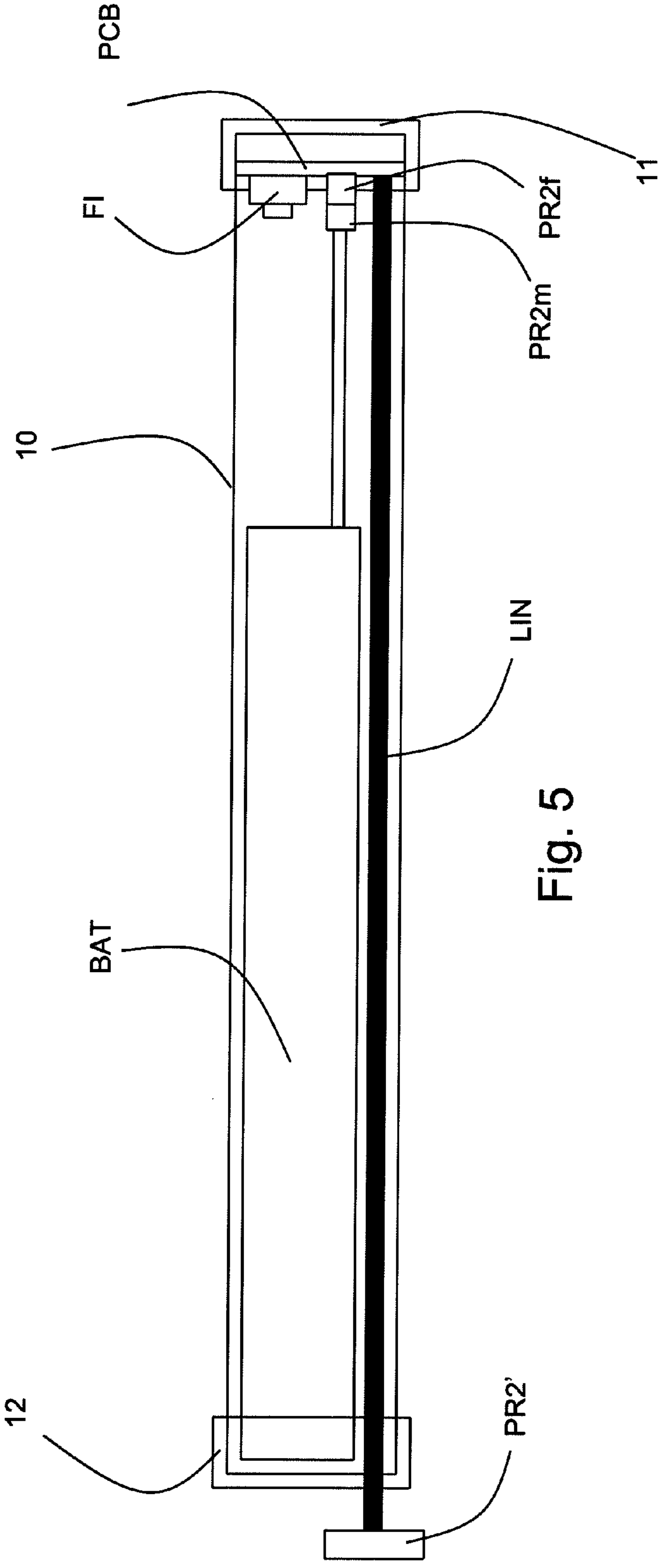
FIG. 5 is a front view of a second embodiment of an actuation assembly according to the invention.

In the embodiment of FIG. 5, shown schematically, the cover 11 takes the form of a cap. The latter can be removed from the casing 10. The printed circuit board PCB is kept in the removable cap 11. A first connector PR2*f* and the functional button Fl of the man-machine interface MMI are mounted on a printed circuit board. A second connector PR2*m* is plugged into the first and allows the battery to be connected to the printed circuit board.

Therefore, when the removable cap is removed from the casing 10, the functional button Fl and the connectors PR2*f* and PR2*m* become accessible. The functional button Fl may then be used to control certain functionalities of the actuator.

Furthermore, the connectors PR2*m* and PR2*f* make it possible to decouple the battery from the actuator. This connector may be used, once decoupled, for connection to an external source for recharging the battery or for directly supplying the actuator.

Advantageously, the functionalities of the charging circuit may be reused during a connection with an external source (for example verifying the level of battery charge).

At the other end of the elongated casing 10, there is another fixed cap 12. The electric connection line LIN between the battery BAT and the actuator ACT passes through the latter. The line LIN is also furnished with another connector PR2', which allows a connection to the actuator. This connector PR2' may be close to the casing or further away on the electric connection line LIN, for example on the actuator itself.

Figure 6:
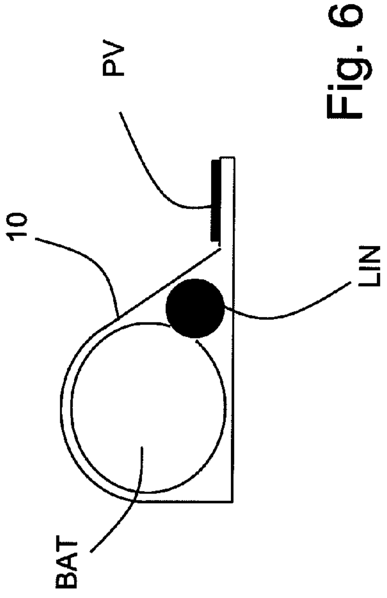
FIG. 6 is a side view of a second embodiment of an actuation assembly according to the invention.

FIG. 6 represents a schematized view in section of the casing of the power supply assembly according to FIG. 5. The casing has a flat bottom surface surmounted by a substantially circular section in which are housed the battery or batteries, or accumulator or accumulators, and a connection line LIN between the printed circuit board PCB and the connector PR2'. The flat bottom surface extends to the side so as to form a supporting surface for the photovoltaic panel PVC. The latter are then connected to the charging circuit REG at one of the ends of the casing.

Figure 7:
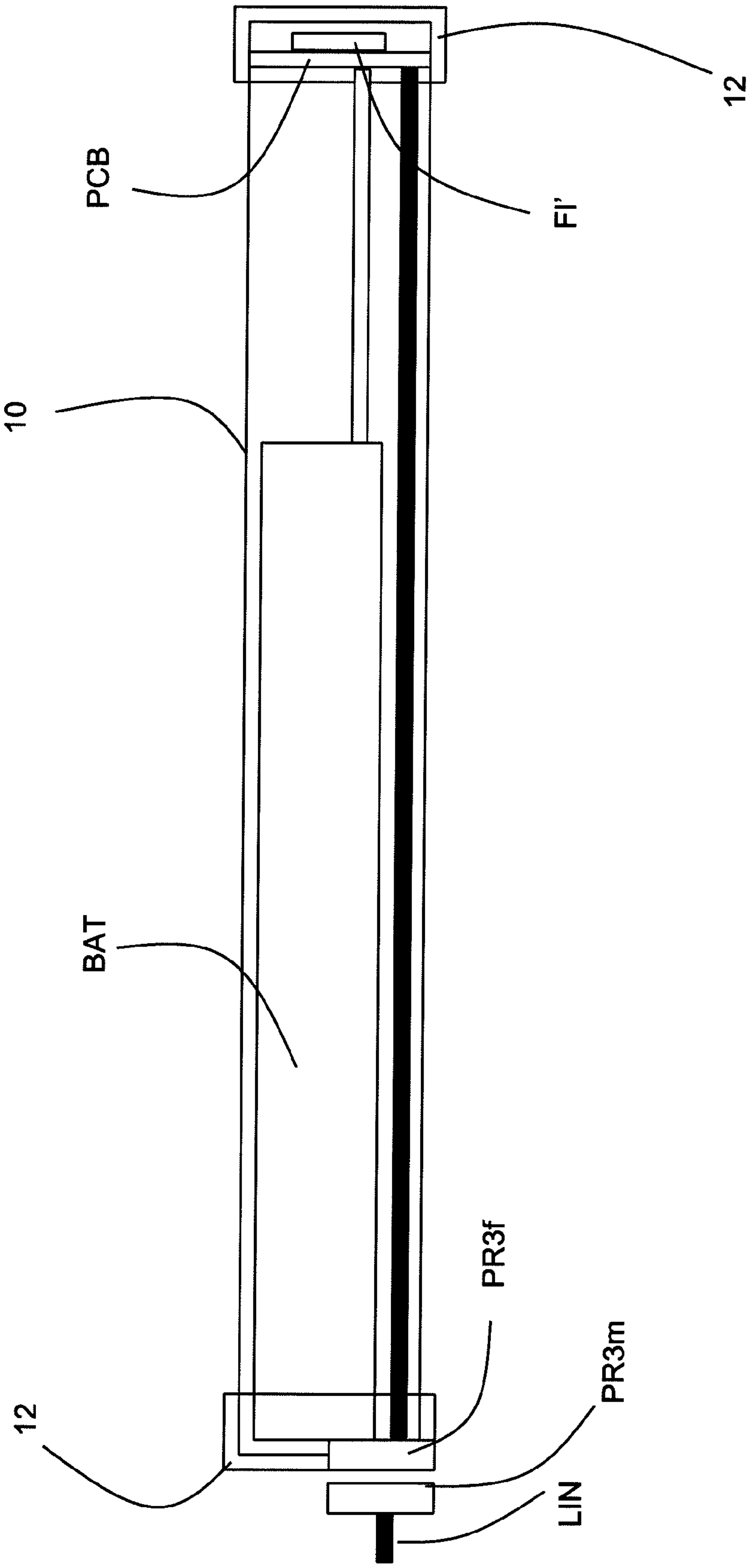
FIG. 7 is a front view of a third embodiment of an actuation assembly according to the invention.
Figure 8:
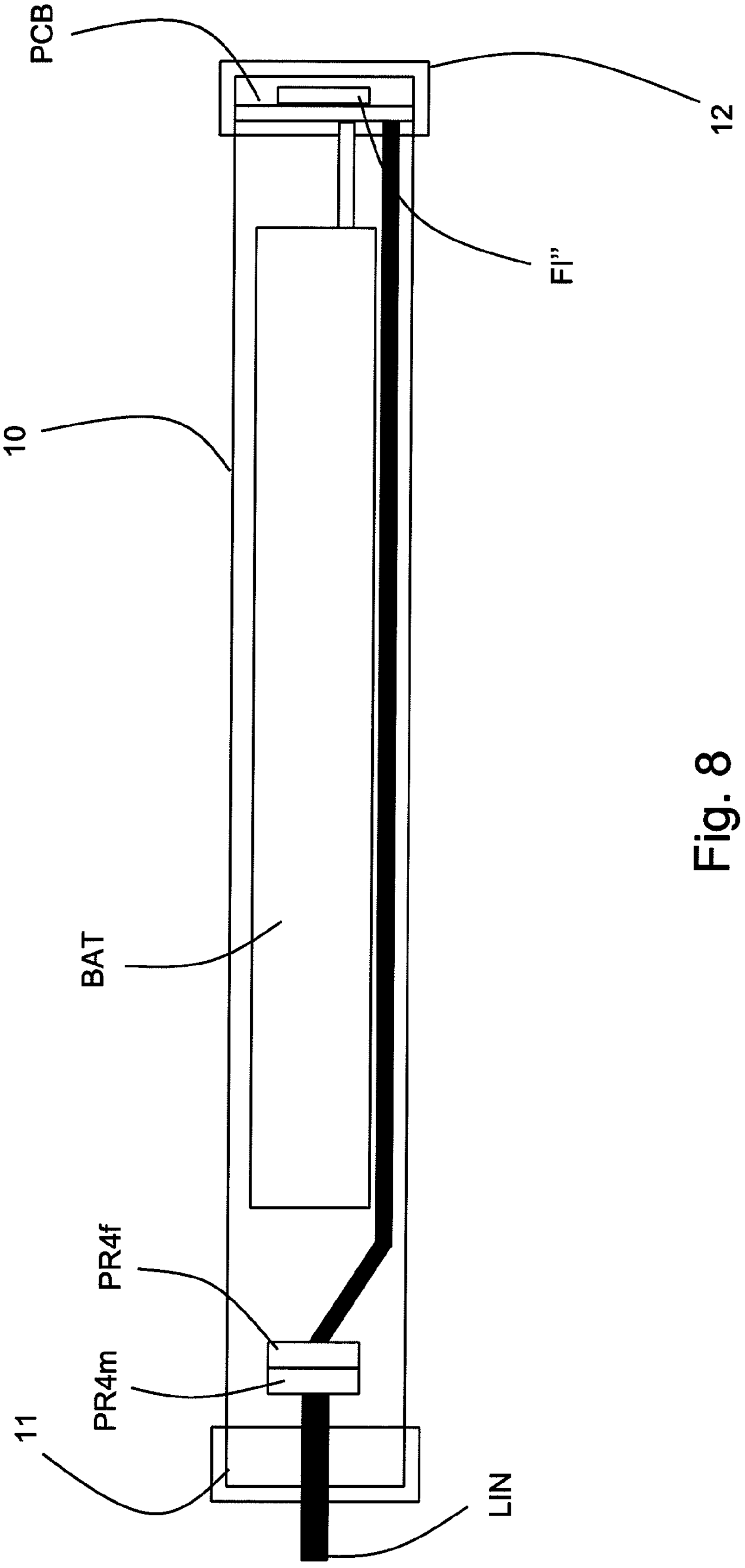
FIG. 8 is a front view of a fourth embodiment of an actuation assembly according to the invention.

The caps 11 and 12 represented in FIG. 5 and in FIGS. 7 and 8 have shapes that match the casing. Alternatively, the casing may be closed at only one end by a cap and at the other by a casing wall.

FIG. 7 shows a third embodiment of the casing 10 of the battery kit. In this embodiment, the two caps 11 and 12 may be permanently mounted. The connector PR for the connection is on the cap 12. Therefore, when the battery can no longer supply the actuator, it is possible to disconnect the latter and directly supply the actuator with an external source EXT by means of a connector PR3*m*, or to recharge the battery by means of the connector PR3*f*. This connector PR is connected to the printed circuit board PCB and to the battery via the printed circuit tracks.

A functional button FI' is of the contactless type that can be activated, for example by magnetic actuation or thanks to a radiofrequency identification system RFID.

FIG. 8 shows a fourth embodiment of the casing 10. A first cap 11, inside which the printed circuit board PCB and a functional button FI" are installed, is attached facing the casing. Here again, the functional button can be activated contactlessly, or can be activated by contact through the wall of the cap 11 (flexible wall for example). The second cap 12 is removable and the connectors PR4*m* and PR4*f* connecting the printed circuit board to the power supply line LIN of the actuator are inside the battery kit. Advantageously, the connectors PR4*m* and PR4*f* are disconnected when a user removes the cap 12 from the casing.

Various combinations of these embodiments can naturally be envisaged, without departing from the context of the invention.

When an actuator is incorporated into a roller blind by an integrator, the latter can easily activate or deactivate the actuator's radio wave listening functionalities. In this manner, if various actuators are present on one adjustment site, only one is listening during the adjustment process (pairing with a remote control, adjustment of ends of travel or of various operating parameters), this adjustment being carried out by radio waves, while the radio receivers of the other actuators are deactivated. Once adjusted, the receiver of the adjusted actuator is again deactivated, which makes it possible to save the energy of the battery that is associated with it, particularly during transport or before installation, while another receiver is activated to adjust this other actuator.

The invention claimed is:

1. An actuation assembly of a screen for closure, solar protection or privacy, the actuation assembly comprising:

- a motorized actuator comprising an electronic control means having a wireless control command receiving means; and
- an autonomous power supply assembly comprising:
  - at least one rechargeable accumulator;
  - a man-machine interface coupled to a command determination unit such that activation of the man-machine interface transmits commands to the command determination unit for translation; and
  - a power supply connector, wherein the power supply connector is adapted to connect the autonomous power supply assembly to the actuator and to transmit power supply and translated commands to the actuator, wherein the translated commands include controls for the function of the wireless control command receiving means.

2. The actuation assembly as claimed in claim 1, wherein the translated commands travel via an electric connection line between the power supply connector and the actuator (ACT).

3. The actuation assembly as claimed in claim 1, wherein the controls included in the translated commands activate or disable the wireless control command receiving means.

4. The actuation assembly as claimed in claim 1, which comprises a casing in which are housed the rechargeable accumulator or accumulators and a command determination unit and the man-machine interface.

5. The actuation assembly as claimed in claim 4, wherein the casing comprises a first removable portion for access to the inside of the casing, the removal of this removable portion allowing access to the man-machine interface and/or access to the power supply connector for connection to an external power supply source.

6. The actuation assembly as claimed in claim 1, wherein the man-machine interface can be activated through the casing.

7. The actuation assembly according claim 1, wherein the man-machine interface is a functional button.

8. The actuation assembly as claimed in claim 1, wherein the actuator comprises means for detecting voltage variations, these variations representing the information transmitted from the power supply assembly.

9. The actuation assembly as claimed in claim 1, wherein the man-machine interface also allows the transmission of control commands to the actuator, irrespective of the state of the wireless control command receiving means.

10. The actuation assembly as claimed in claim 1, wherein the man-machine interface also allows the transmission of commands to modify the adjustment parameters of the actuator.

11. An installation comprising a screen for closure, solar protection or privacy and an actuation assembly as claimed in claim 1.

* * * * *